2,878,129

DENTAL IMPRESSION MATERIAL

Alexander Rabchuk, Detroit, Mich., assignor to Kerr Manufacturing Company, Detroit, Mich., a corporation of Michigan No Drawing. Application December 7, 1953
Serial No. 396,779

10 Claims. (Cl. 106—38.4)

The invention relates to impression materials, particularly elastic dental impression materials. In the present state of the art of impression materials, compositions are known containing a gel-forming agent such as a soluble alginate together with other substances which in the presence of water will precipitate and solidify the gel to a consistency useful for dental purposes.

The present invention relates to an improved composition and is based on the discovery of a new precipitating agent, basic lead silicate sulfate, and a new association of other ingredients cooperating therewith and with the gel-forming agent to form an elastic impression material having desirable properties for dental purposes.

The dental impression composition of this invention comprises a gel-forming agent, usually a soluble alginate, and basic lead silicate sulfate which functions as a setting or congelation agent. In addition to these two principal ingredients, the composition of this invention preferably includes a retarding agent which gives a predetermined control over the congelation or setting time, an inert filler and desirably also one or more other ingredients referred to as modifiers which impart desirable characteristics to the composition for its intended purpose.

The composition of this invention is useful in the making of full dentures, partial dentures, inlays, bridges and other devices for dental purposes and it provides a medium for taking impressions of the dental and oral tissues. The composition is mixed with water, at the time of use, to a thick yet semi-fluid mixture, which is placed in a suitable tray. This loaded tray is carried to the mouth and is seated upon or over the object or objects and in several minutes' time solidifies to an elastic gel.

The gel is elastic so it can be pulled over teeth or hard undercut structures, as well as the softer tissues in situ, and produce a negative of the structure with complete detail. The gel is used as a mold, without the use of fixing solutions of any kind, for casting stone, investments or plasters, and upon their hardening they form a complete accurate duplication of the master medium.

The gel-forming agent used in the impression compositions of this invention is of the class which includes the water-soluble salts of alginic acid, such as the alkali metal alginates, water soluble pectate salts and other pectins, alkali metal carboxy methyl cellulose, and other equivalent materials.

Retarding agents used in the compositions of this invention are of the class including soluble alkali metal phosphates or silicates alone or in conjunction with such salts as alkali metal sulfates or chlorides. Suitable fillers are diatomaceous earth, silicas, resins, or other insoluble materials such as heavy metal phosphates, carbonates or silicates.

Modifiers include fluosilicates, fluozirconates and gluconates. The following are given as examples of impression materials whose compositions render them suitable as dental impression materials:

*Example 1*

| | Weight in grams |
|---|---|
| Sodium alginate | 2.0 |
| Basic lead silicate sulfate | 5.0 |
| Tetra sodium pyrophosphate | 0.1 |
| Glucono delta lactone | 0.3 |
| Diatomaceous earth | 11.0 |

*Example 2*

| | Weight in grams |
|---|---|
| Sodium alginate | 2.0 |
| Basic lead silicate sulfate | 5.0 |
| Tetra sodium pyrophosphate | 0.5 |
| Sodium silicofluoride | 0.5 |
| Diatomaceous earth | 11.0 |

*Example 3*

| | Weight in grams |
|---|---|
| Sodium alginate | 2.0 |
| Basic lead silicate sulfate | 4.0 |
| Sodium dihydrogen phosphate | 0.1 |
| Aluminum fluosilicate | 1.0 |
| Diatomaceous earth | 11.0 |

The compositions of the above examples can be prepared by blending the dry ingredients in a mill, and the mixture thus obtained may be packaged and stored with good shelf life over extended periods of time.

The composition of Example 1 when mixed with 60 cc. of water at 70° F. allows a working time of 1¼ minutes and as a setting time of 2 minutes. Example 2 under the same conditions has a working time of 1½ minutes and a setting time of 2 minutes. Example 3 under the same conditions has a working time of 3 minutes and a setting time of 6 minutes.

It is to be understood that while the examples given include the best mode contemplated of carrying out the invention, the specific mixtures of ingredients in the examples can be modified in accordance with the general teachings without departing from the invention.

What I claim as my invention is:

1. A composition consisting essentially of a gel-forming agent of the class consisting of water-soluble alginates, pectates, pectins and carboxy methyl cellulose and basic lead silicate sulfate.

2. A composition as defined in claim 2 containing also a retarder of the class consisting of alkali metal phosphates and silicates, a modifier of the class consisting of fluosilicates and gluconates and a filler in amount at least about 50%.

3. A composition capable of forming with water an elastic impression material consisting essentially of a water-soluble alginate, basic lead silicate sulfate in amount greater than said alginate, and a filler in amount at least about 50%.

4. A composition capable of forming with water an elastic impression material consisting essentially of a water-soluble alginate, basic lead silicate sulfate, an alkali metal phosphate, a fluosilicate and diatomaceous earth.

5. A composition capable of forming with water an elastic impression material consisting essentially of a water-soluble alginate, basic lead silicate sulfate, a gluconate, an alkali metal phosphate and diatomaceous earth.

6. A composition capable of forming with water an elastic impression material consisting essentially of about 10% of a water-soluble alginate, about 25% basic lead silicate sulfate, an alkali metal phosphate, a fluosilicate and at least about 50% diatomaceous earth.

7. A composition capable of forming with water an elastic impression material consisting essentially of about 10% of a water-soluble alginate, about 25% basic lead silicate sulfate, at least about 50% filler and a fluozirconate.

8. A mold formed of the reaction product of water with a composition consisting essentially of about 10% of a water-soluble alginate, at least about 50% diatomaceous earth and about 25% basic lead silicate sulfate.

9. A mold formed of the reaction product of water with a composition consisting essentially of a water-soluble alginate, at least about 50% diatomaceous earth, an alkali metal pyrophosphate, a fluosilicate and about 25% basic lead silicate sulfate.

10. A dental impression composition consisting essentially of about 10% sodium alginate, about 25% basic lead silicate sulfate, at least about 50% filler, an alkali metal phosphate, and a fluosilicate.

References Cited in the file of this patent

UNITED STATES PATENTS

| | | |
|---|---|---|
| 2,422,497 | Noyes | June 17, 1947 |
| 2,441,729 | Steiner | May 18, 1948 |
| 2,568,752 | Lochridge | Sept. 25, 1951 |
| 2,623,808 | Meyer | Dec. 30, 1952 |
| 2,628,153 | Noyes et al. | Feb. 10, 1953 |
| 2,631,082 | Noyes | Mar. 10, 1953 |
| 2,652,312 | Fink | Sept. 15, 1953 |
| 2,657,971 | Lochridge | Nov. 3, 1953 |
| 2,667,464 | Greenhalgh | Jan. 26, 1954 |